United States Patent [19]

Pionte

[11] 3,841,454
[45] Oct. 15, 1974

[54] CLUTCH LASH AND WEAR ADJUSTMENT MECHANISM

[75] Inventor: Donald M. Pionte, Washington, Mich.

[73] Assignee: General Motors Corporation, Detroit, Mich.

[22] Filed: June 22, 1973

[21] Appl. No.: 372,520

[52] U.S. Cl. ........ 192/111 R, 192/110 R, 192/99 A, 192/94, 192/89 A, 74/512

[51] Int. Cl. ...................... F16d 11/02, F16d 13/75

[58] Field of Search ........ 192/111 R, 111 B, 110 R, 192/99 A, 99 S, 94, 109 R, 89 B, 89 R, 98, 89 A; 74/512

[56] References Cited
UNITED STATES PATENTS

| | | | |
|---|---|---|---|
| 2,762,481 | 9/1956 | Sheerin | 192/94 |
| 3,005,530 | 10/1961 | Fawick | 192/99 S |
| 3,730,318 | 5/1973 | Camp | 192/99 S |
| 3,788,438 | 1/1974 | Reno | 192/110 R |
| 3,795,295 | 3/1974 | Reno | 192/110 R |
| 3,795,408 | 3/1974 | Nemessanyi | 192/89 R X |

*Primary Examiner*—Samuel Scott
*Assistant Examiner*—Lance W. Chandler
*Attorney, Agent, or Firm*—John P. Moran

[57] ABSTRACT

This disclosure describes a lash and/or wear adjustment mechanism exterior of a vehicular clutch housing, for use with a cable-controlled rotatable and axially movable spring-loaded throwout bearing, including and adjusting nut threadedly adjustably mounted in the clutch housing, with a locknut therefor and cable-retainer means for two cables, one leading to the throwout bearing and the other leading to the clutch pedal; one embodiment having cable housing means for permitting adjustment without causing cable twist and another embodiment having means for retaining one cable in a constant position while adjusting the other cable relative thereto.

7 Claims, 4 Drawing Figures

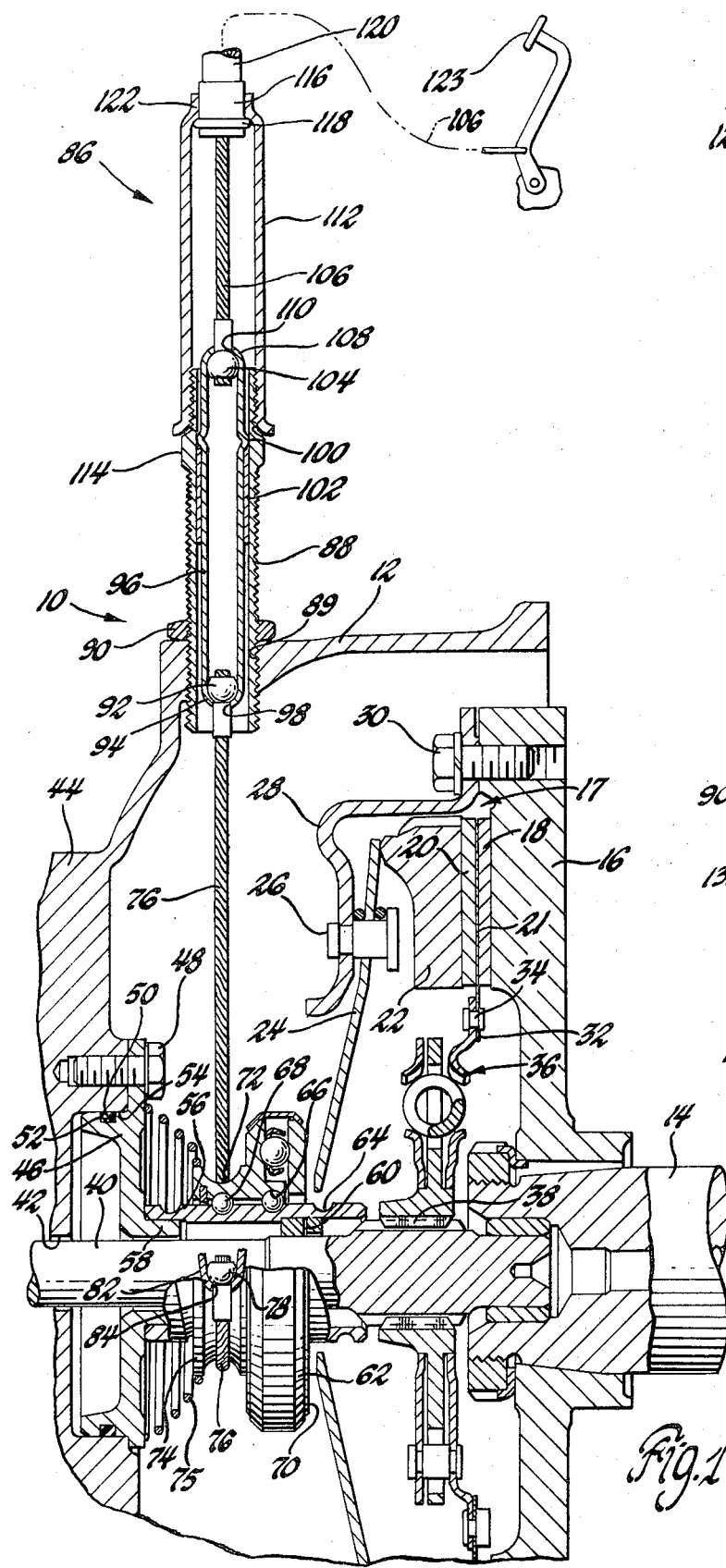
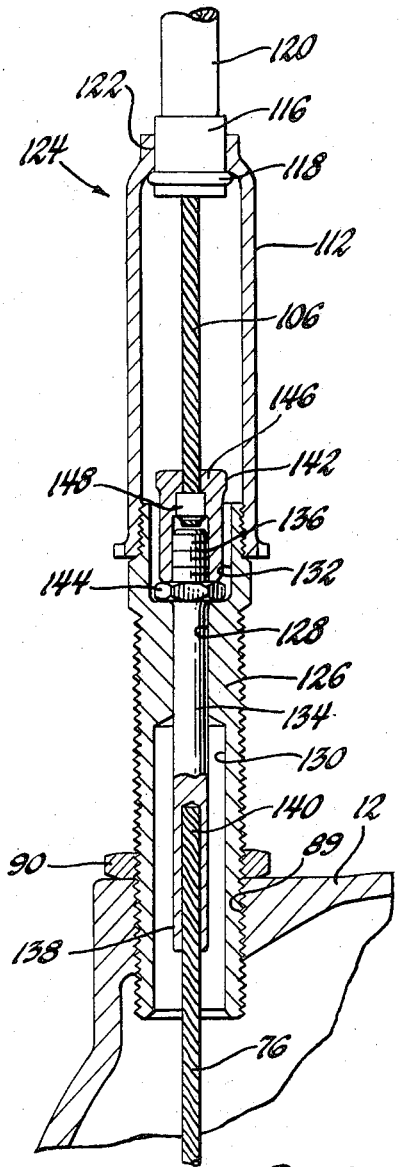
Fig.1
Fig.2

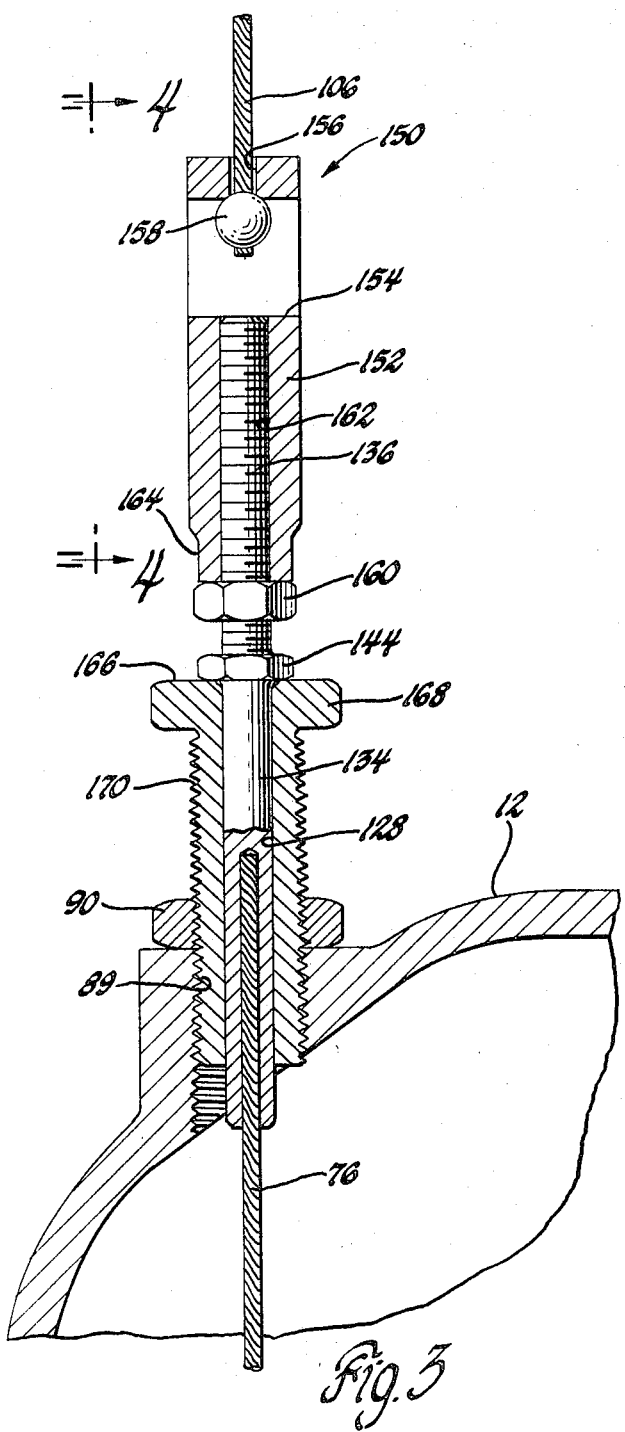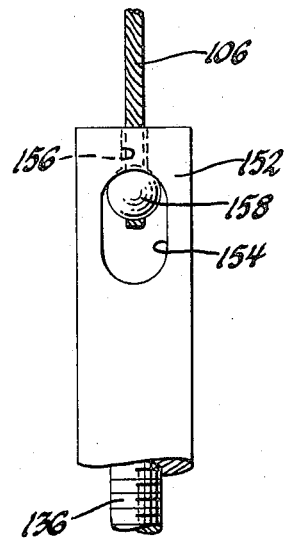

CLUTCH LASH AND WEAR ADJUSTMENT MECHANISM

This invention relates generally to cable-controlled vehicular clutches and, more particularly, to an improved external adjustment means therefor.

While cable-controlled vehicular clutches for use with manual transmissions have been advocated (for example, U.S. Pat. Nos. 2,762,481 Sheerin and 3,005,530 Fawick), they have not heretofore been extensively used. A suitable external adjustment means for lash and/or wear is desirable in the event such cable-controlled clutches do become commercially acceptable.

Accordingly, an object of this invention is to provide improved external adjustment means for cable-controlled vehicular clutches.

Another object of the invention is to provide improved external adjustment means for cable-controlled vehicular clutches, wherein a first cable is connected between the adjustment means and a rotatable and axially movable spring-loaded throwout bearing and may be moved outwardly or inwardly without twisting by the adjustment means, to thereby axially move the throwout bearing to compensate for lash and/or clutch disc wear, while a second cable is connected between the adjustment means and the clutch pedal.

A further object of the invention is to provide such an external adjustment means, wherein, in one embodiment the adjustment means includes provisions for maintaining the second cable in a constant position while permitting adjustment of the first cable.

These and other objects and advantages of the invention will be apparent when reference is made to the following description and accompanying drawings, wherein:

FIG. 1 is a fragmentary cross-sectional view of a cable-controlled vehicular clutch embodying the invention;

FIG. 2 is a fragmentary cross-sectional view of an alternate embodiment of the invention;

FIG. 3 is a fragmentary cross-sectional view of another alternate embodiment of the invention; and FIG. 4 is a side elevational view taken along the plane of line 4—4 of FIG. 3, and looking in the direction of the arrows.

Referring now to the drawings in greater detail, FIG. 1 illustrates a cable-controlled clutch mechanism 10 including a housing 12 in which is mounted an engine-driven power input shaft 14 having a flywheel 16 secured thereto adjacent a clutch disc assembly 17 including clutch discs 18 and 20, respectively, and an intermediate connector disc 21, the members 18, 20, and 21 being secured together by any suitable means, such as rivets (not shown). A pressure plate 22 is mounted adjacent the disc 20 and urged by a conically-shaped Belleville clutch spring 24 into contact therewith so as to frictionally confine the discs 18 and 20 between oppositely disposed faces of the pressure plate 22 and the flywheel 16. The Belleville clutch spring 24 is pivoted at an intermediate point thereof on pivot pins 26 mounted on a cover plate 28 which is secured by bolts 30 to the flywheel 16.

The radially inner edge 32 of the connector disc 21 of the clutch disc assembly 17 is connected by rivets 34 to a dampening mechanism 36 which, in turn, is secured by splines 38 to an output or clutch-driven shaft 40. The shaft 40 extends through an opening 42 formed in an end wall 44 of the housing 12. If the dampening mechanism 36 is not required for a particular application, any suitable connector means could be utilized between the inner edge 32 and the splines 38.

A throwout sleeve support member 46 is mounted around the shaft 40 and secured to the inner surface of the wall 44 by bolts 48. A seal ring 50 is mounted in a groove 52 formed around an outer peripheral portion of the support member 46 adjacent a recess 54 formed in the wall 44. A clutch throwout sleeve 56 is mounted at one end thereof on a hub portion 58 of the support member 46, and at the other end thereof on a bearing 60 mounted around the shaft 40.

A clutch throwout bearing 62 is mounted around the sleeve 56, the latter serving as a screw shaft for rotatable and axial movement of the throwout bearing 62. Specifically, a spiral groove 64 is formed around the outer periphery of the sleeve 56, while a complementary spiral groove 66 is formed around the inner periphery of the throwout bearing 62. A plurality of balls 68 are mounted in the grooves 64/66 such that one-half of each ball 68 is disposed in each of the grooves 64 and 66. A face 70 of the throwout bearing 62 is positioned adjacent the radial inner portion of the Belleville clutch spring 24. It should be realized that a suitable threaded arrangement could be utilized in lieu of the balls 68 and spiral grooves 64/66 to facilitate axial movement of the throwout bearing 62.

An annular groove 72 is formed around an outer race or hub 74 of the throwout bearing 62 opposite the face 70. A return spring 75 is connected at its ends in any suitable manner to the end of the hub 74 and the support member 46, respectively, urging the throwout bearing 62 toward the support member 46. A cable 76 is initially mounted around approximately a 180° portion of the annular groove 72. A spherical-shaped clip 78 is crimped onto an end of the cable 76 and retained in a hanger member 82 which is secured to the throwout bearing hub 74. The cable 76 extends through an opening 84 formed in the hanger member 82, and around the lower half (FIG. 1) of the annular groove 72 and, thence, upwardly into a wear and lash adjustment mechanism 86 having an externally threaded lash adjusting nut 88 thereof threadedly secured in a threaded opening 89 formed in the housing 12. A lock- or jam-nut 90 is threadedly mounted on the adjusting nut 88 for abutment against the housing 12. A second spherical-shaped clip 92 is crimped onto the other end of the cable 76 and retained in a first contoured collar 94 formed on an end of a cylindrical member 96 mounted concentrically within the adjusting nut 88, the cable 76 extending through an axial opening 98 formed in the collar 94.

The cylindrical member 96 is retained in place within the adjusting nut 88 by virtue of having a flange 100 formed around an upper portion (FIG. 1) thereof and seated on an inner sleeve member 102 secured within the adjusting nut 88.

A third spherical-shaped clip 104 is crimped onto an end of a second upper cable 106 and retained in a second contoured collar 108 formed on the other end of the cylindrical member 96, the cable 106 extending upwardly (FIG. 1) through an axial opening 110 formed in the collar 108.

An internally threaded cable housing nut 112 is threadedly secured to the externally threaded adjusting nut 88, abutting against a hexagonal-shaped flange 114 formed on the outer periphery of the adjusting nut 88. A fitting 116 having a flange 118 formed thereon is secured to an end of a cable sheath 120 enclosing the cable 106, the flange 118 abutting against a collar 122 formed on the upper end of the nut 112. The cable 106 extends from the cylindrical member 96 axially through the length of the nut 112 and through the sheath 120 to be operatively connected to a conventional pivotally mounted clutch pedal 123.

OPERATION

The throwout bearing 62 is adjusted for lash at assembly by first screwing the adjusting nut 88 outwardly in the threaded opening 89 in the housing 12 until the throwout bearing contacts the Belleville spring 24. Specifically, the cable 76 will have rotated the throwout bearing 62 on the screw shaft formed by the balls 68 and the spiral grooves 64/66, against the force of the return spring 75. Once contact with the Belleville spring 24 is made, the adjusting nut 88 is then threaded a predetermined amount say, 1¼ turns, inwardly in the threaded opening 89, backing the throwout bearing 62 a desired distance from the Belleville clutch spring 24.

In subsequent use, as the clutch discs 18 and 20 wear by virtue of being frictionally engaged between the flywheel 16 and the pressure plate 22, adjustment, as required, is accomplished by first loosening the locknut 90, turning the adjusting nut 88 outwardly in the threaded opening 89 thereby moving the throwout bearing 62 axially away from the adjacent surface of the Belleville spring 24, through the cable 76 and the above-described screw shaft arrangement, against the force of the spring 75. The locknut 90 is then threadedly moved back into abutting or locking contact with the housing 12.

Throughout such adjustment process, since the spring 75 continuously urges the throwout bearing 62 leftwardly (FIG. 1), the bearing 62 and the cable 76 being thus caused to rotate on the screw drive, the cable 76 and its spherical-shaped end clip 92 will maintain the flange 100 of the cylindrical member 96 in contact with the upper edge of the inner sleeve member 102 secured within the adjusting nut 88.

Throughout the adjustment operation, the cable housing nut 112 may be removed from the end of the adjusting nut 88, or may be retained thereon and caused to swivel about the fitting 116.

While it is apparent that the upper cable 106 will be moved in response to the movement of the lower cable 76, it may be realized that the bend or bow in the cable 106 and sheath 120 between the fitting 116 and the clutch pedal 123 changes, and is resecured as required to maintain a constant clutch pedal stroke.

FIG. 2 EMBODIMENT

The alternate lash and wear adjustment mechanism embodiment 124 of FIG. 2 includes an externally threaded adjusting nut 126 threadedly mounted in the threaded opening 89 in the housing 12, with the locknut 90 operatively connected thereto. An axial passage 128 is formed through the adjusting nut 126, with enlarged openings 130 and 132 formed in the opposite ends thereof.

A rod member 134 is slidably mounted through the axial passage 128, the rod member 134 having one end 136 thereof externally threaded into the end 138 thereof counterbored to receive an end 140 of the cable 76. The counterbored end 138 is crimped onto the end 140 of the cable 76. A cable-retainer nut 142 is threadedly mounted on the threaded end 136 of the rod member 134. A hexagonal-shaped flange or collar 144 is formed on the rod member 134. A collar 146 is formed on the outer end of the cable-retainer nut 142. An end clip 148 is crimped onto the end of the cable 106 extending through the cable housing nut 112, the fitting 116 and the cable sheath 120 to the clutch pedal 123, the end clip 148 being retained by the collar 146 of the cable-retainer nut 142.

The adjustment process consists of first loosening the cable housing nut 112 and the cable-retainer nut 142 from the adjusting nut 126 and the rod member 134, respectively, then loosening the locknut 90 from the housing 12, and threading the adjusting nut 126 inwardly or outwardly in the threaded opening 89, as required. The locknut 90, the cable-retainer nut 142, and the cable housing nut 112 are then returned to their respective assembled positions, with the bow of the cable 106 being resecured intermediate the fitting 116 and the clutch pedal 123, as was the case with the FIG. 1 embodiment.

FIG. 3 EMBODIMENT

The alternate adjustment mechanism embodiment 150 illustrated in FIG. 3 has its rod member 134 extending through the axial passage 128 similarly to that of FIG. 2, but with a single cable-retainer nut 152 being used in lieu of the cable housing nut 112 and the collar 108 arrangement of FIG. 1, and in lieu of the cable housing nut 112 and the cable-retainer nut 142 of FIG. 2.

As better seen in FIG. 4, an oval-shaped opening 154 is formed transversely through the cable-retainer nut 152, with an axial opening 156 formed in the upper end thereof, communicating with the oval transverse opening 154. A spherical-shaped clip 158 is crimped onto the end of the cable 106 and retained in the oval opening 154, with the cable 106 extending upwardly through the axial opening 156. The cable-retainer nut 152 is threadedly mounted via an internally threaded opening 162 on the threaded end 136 of the rod member 134, and retained in position thereon by a locknut 160. Oppositely disposed flats 164 are formed on the cable-retainer nut 152.

The hexagonal-shaped flange 144 formed on the rod member 134 abuts against the top face 166 of a second hexagonal-shaped flange or collar 168 formed on the end of an adjusting nut 170 which is used in lieu of the adjusting nuts 88 of FIG. 1 and 126 of FIGS. 2 and 3.

In operation, the locknuts 90 and 160 are first loosened from the faces of the housing 12 and the cable-retainer nut 152, respectively, the adjusting nut 170 then turned outwardly or inwardly in the threaded opening 89, as required to adjust the throwout bearing 62 for initial lash or subsequent clutch disc wear, while the cable-retainer nut 152 is maintained in place by the use of an appropriate tool on the flats 164. The cable 106 length is thereby held constant, maintaining a constant stroke for the clutch pedal 123. After such adjustment, the locknuts 90 and 160 are once again locked against the housing 12 and the cable-retainer nut 152, respectively.

The spring 75 will serve to maintain the hexagonal-shaped flange 144 on the rod member 134 against the face 166 of the adjusting nut 170 via the ball-screw drive and the cable 76 which is secured to the rod member 134 by crimping the end of the latter as described above relative to FIG. 2.

It should be apparent that the invention provides an improved, simplified, and readily accessible means for adjusting the throwout bearing of a cable-controlled vehicular clutch, both for correct lash at assembly and for subsequent operational wear of the clutch discs.

While three embodiments of the invention have been shown and described, other modifications thereof are possible.

I claim:

1. For use with a clutch pedal and a cable-controlled clutch including a housing and a rotatable and axially movable spring-loaded throwout bearing mounted in said housing, a wear and lash adjustment mechanism comprising a threaded opening formed in said housing, an externally threaded adjusting nut having one end thereof threadedly mounted in said threaded opening, a locknut mounted on said adjusting nut for abutting against said housing, a collar adaptable for receiving a turning tool formed on the outer periphery of said adjusting nut, an abutment surface formed on said adjusting nut, a cable-retainer member concentrically freely mounted within said adjusting nut, a flange formed on said cable-retainer member at an intermediate point therealong and abutting against said abutment surface, a first cable connected between one end of said cable-retainer member and a predetermined point on the outer periphery of said throwout bearing, a second cable operatively connected between the other end of said cable-retainer member and said clutch pedal, and means associated with said cable-retainer member and said second cable for permitting said adjusting nut to be threadedly adjusted in said threaded opening without twisting said first and second cables.

2. For use with a clutch pedal and a cable-controlled clutch including a housing and a rotatable and axially movable spring-loaded throwout bearing mounted in said housing, a wear and lash adjustment mechanism comprising a threaded opening formed in said housing, an externally threaded adjusting nut having one end thereof threadedly mounted in said threaded opening, a locknut mounted on said adjusting nut for abutting against said housing, a collar adaptable for receiving a turning tool formed on the outer periphery of said adjusting nut intermediate the ends thereof, a shoulder formed on the inner wall of said adjusting nut, a cylindrical member concentrically freely mounted within said shoulder, a flange formed on said cylindrical member at an intermediate point therealong and abutting against said shoulder, first and second contoured ends formed on said cylindrical member, a first cable connected between said first contoured end and a predetermined point on the outer periphery of said throwout bearing, a second cable operatively connected between said second contoured end and said clutch pedal, a sheath mounted around said second cable, and a cable housing nut threadedly secured to said adjusting nut against said collar thereof and swivelably connected to an end of said sheath.

3. For use with a clutch pedal and a cable-controlled clutch including a housing and a rotatable and axially movable spring-loaded throwout bearing mounted in said housing, a wear and lash adjustment mechanism comprising a threaded opening formed in said housing, an externally threaded adjusting nut having one end thereof threadedly mounted in said threaded opening, a locknut mounted on said adjusting nut for abutting against said housing, a collar adaptable for receiving a turning tool formed on the outer periphery of said adjusting nut intermediate the ends thereof, a sleeve member secured to the inner wall of said adjusting nut, a cylindrical member concentrically freely mounted within said sleeve member, a flange formed on said cylindrical member at an intermediate point therealong and abutting against the outermost edge of said sleeve member, first and second contoured ends formed on said cylindrical member, a first cable having a first spherical end member crimped onto one end thereof and connected to said first contoured end and a second spherical end member crimped onto the other end thereof and connected to a predetermined point on the outer periphery of said throwout bearing, a second cable having a third spherical end member crimped onto one end thereof and connected to said second contoured end, said second cable being operatively connected between said second contoured end and said clutch pedal, a sheath mounted around said second cable, and a cable housing nut threadedly secured to said adjusting nut against said collar thereof and swivelably connected to an end of said sheath.

4. For use with a clutch pedal and a cable-controlled clutch including a housing and a rotatable and axially movable spring-loaded throwout bearing mounted in said housing, a wear and lash adjustment mechanism comprising a threaded opening formed in said housing, an externally threaded adjusting nut having one end thereof threadedly mounted in said threaded opening, a locknut mounted on said adjusting nut for abutting against said housing, a collar adaptable for receiving a turning tool formed on the outer periphery of said adjusting nut intermediate the ends thereof, a shoulder formed on the inner wall of said adjusting nut adjacent the outer end thereof, a rod member concentrically freely mounted within said adjusting nut, a flange formed on said rod member at an intermediate point therealong and abutting against said shoulder, external threads formed on the outermost end of said rod member, a first cable connected between the other end of said rod member and a predetermined point on the outer periphery of said throwout bearing, an internally threaded cable-retainer nut mounted on said external threads, a second cable operatively connected between said cable-retainer nut and said clutch pedal, a sheath mounted around said second cable, and a cable housing nut threadedly secured to said adjusting nut against said collar thereof and swivelably connected to an end of said sheath.

5. For use with a clutch pedal and a cable-controlled clutch including a housing and a rotatable and axially movable spring-loaded throwout bearing mounted in said housing, a wear and lash adjustment mechanism comprising a threaded opening formed in said housing, an externally threaded adjusting nut having one end thereof threadedly mounted in said threaded opening, a locknut mounted on said adjusting nut for abutting against said housing, a collar adaptable for receiving a turning tool formed on the outer periphery of said adjusting nut intermediate the ends thereof, a shoulder formed on the inner wall of said adjusting nut, a rod member concentrically freely mounted within said adjusting nut, a flange formed on said rod member at an intermediate point therealong and abutting against said shoulder, external threads formed on one end of said rod member and an axial opening formed on the other end of said rod member, a first cable connected between said axial opening and a predetermined point on the outer periphery of said throwout bearing, an internally threaded cable-retainer nut mounted on said external threads and having an internal flange formed on the outermost end thereof, a second cable having a cylindrical member crimped onto one end thereof and connected to said internal flange, said second cable being operatively connected between said internal flange and said clutch pedal, a sheath mounted around said second cable, and a cable housing nut threadedly secured to said adjusting nut against said collar thereof and swivelably connected to an end of said sheath.

6. For use with a clutch pedal and a cable-controlled clutch including a housing and a rotatable and axially movable spring-loaded throwout bearing mounted in said housing, a wear and lash adjustment mechanism comprising a threaded opening formed in said housing, an externally threaded adjusting nut having one end thereof threadedly mounted in said threaded opening, a first locknut mounted on said adjusting nut for abutting against said housing, a collar adaptable for receiving a turning tool formed on the other end of said adjusting nut, a rod member concentrically freely mounted within said adjusting nut, a flange formed on said rod member at an intermediate point therealong and abutting against said collar, external threads formed on the outermost end of said rod member, a first cable connected between the other end of said rod member and a predetermined point on the outer periphery of said throwout bearing, an internally threaded cable-retainer nut mounted on said external threads, a second locknut mounted on said external threads for abutting against said cable-retainer nut, retainer means formed on the exposed end of said cable-retainer nut, and a second cable operatively connected between said retainer means and said clutch pedal.

7. For use with a clutch pedal and a cable-controlled clutch including a housing and a rotatable and axially movable spring-loaded throwout bearing mounted in said housing, a wear and lash adjustment mechanism comprising a threadeed opening formed in said housing, an externally threaded adjusting nut having one end thereof threadedly mounted in said threaded opening, a first locknut mounted on said adjusting nut for abutting against said housing, a collar adaptable for receiving a turning tool formed on the other end of said adjusting nut, a rod member concentrically freely mounted within said adjusting nut, a flange formed on said rod member at an intermediate point therealong and abutting against said collar, external threads formed on one end of said rod member and an axial opening formed on the other end of said rod member, a first cable connected between said axial opening and a predetermined point on the outer periphery of said throwout bearing, an internally threaded cable-retainer nut mounted on said external threads, a second locknut mounted on said external threads for abutting against said cable-retainer nut, a transverse opening formed through said cable-retainer nut adjacent the exposed end thereof, an axial opening formed in said exposed end communicating with said transverse opening, and a second cable having a spherical end member crimped onto one end thereof and extending through said axial opening such that said spherical end member is seated in said transverse opening, said second cable being operatively connected between said transverse opening and said clutch pedal.

* * * * *